United States Patent
Greindl

(10) Patent No.: US 10,780,898 B2
(45) Date of Patent: Sep. 22, 2020

(54) TRACK MAINTENANCE MACHINE WITH AN AUTONOMOUS AND REDUNDANT POWER SUPPLY AND METHOD FOR OPERATING AN ENERGY SUPPLY SYSTEM OF A TRACK MAINTENANCE MACHINE

(71) Applicant: PLASSER & THEURER EXPORT VON BAHNBAUMASCHINEN GESELLSCHAFT M.B.H., Vienna (AT)

(72) Inventor: Alexander Greindl, Niederneukirchen (AT)

(73) Assignee: Plasser & Theurer Export von Bahnbaumaschinen Gesellschaft M.B.H., Vienna (AT)

( * ) Notice: Subject to any disclaimer, the term of this patent is extended or adjusted under 35 U.S.C. 154(b) by 268 days.

(21) Appl. No.: 15/754,309

(22) PCT Filed: Aug. 26, 2016

(86) PCT No.: PCT/EP2016/001444
§ 371 (c)(1),
(2) Date: Feb. 22, 2018

(87) PCT Pub. No.: WO2017/050414
PCT Pub. Date: Mar. 30, 2017

(65) Prior Publication Data
US 2019/0016348 A1    Jan. 17, 2019

(30) Foreign Application Priority Data
Sep. 23, 2015    (AU) .................................. A 619/2015

(51) Int. Cl.
*B61C 3/02*    (2006.01)
*B61C 7/04*    (2006.01)
(Continued)

(52) U.S. Cl.
CPC .................. *B61C 3/02* (2013.01); *B60K 6/20* (2013.01); *B60K 6/365* (2013.01); *B60K 6/387* (2013.01);
(Continued)

(58) Field of Classification Search
CPC .... B61C 9/00; B61C 9/08; B61C 9/10; B61C 9/14; B61C 3/00; B61C 3/02; E01B 27/00; E01B 29/00; E01B 31/00; E01B 33/00
See application file for complete search history.

(56) References Cited

FOREIGN PATENT DOCUMENTS

| DE | 2232476 A1 * | 1/1974 | ............ E01B 29/00 |
| DE | 2232476 A1 | 1/1974 | |

(Continued)

*Primary Examiner* — Robert J McCarry, Jr.
(74) *Attorney, Agent, or Firm* — Laurence A. Greenberg; Werner H. Stemer; Ralph E. Locher

(57) ABSTRACT

A track maintenance machine includes a machine frame being movable on a track, a plurality of working units, and a combustion engine to be connected by a clutch to a transfer case. Hydraulic pumps for supplying a plurality of hydraulic drives of a hydraulic system are connected to the transfer case. An electric motor is provided as an alternative drive of the transfer case for permanent energy supply of the working units and drives. The electric motor is coupled to an intermediate circuit to be supplied with electric energy by a vertically adjustable pantograph to be applied to a catenary of the track. A generator or an electric energy storage device is provided for alternative energy supply of the intermediate circuit. A method for operation of an energy supply system is also provided.

8 Claims, 1 Drawing Sheet

(51) Int. Cl.
    *B61C 9/14*       (2006.01)
    *E01B 27/00*      (2006.01)
    *E01B 29/00*      (2006.01)
    *B60K 6/48*       (2007.10)
    *B60K 6/365*      (2007.10)
    *B61C 17/00*      (2006.01)
    *B60K 6/387*      (2007.10)
    *B60K 6/20*       (2007.10)
    *B60W 20/40*      (2016.01)

(52) U.S. Cl.
    CPC ............... *B60K 6/48* (2013.01); *B60W 20/40* (2013.01); *B61C 7/04* (2013.01); *B61C 9/14* (2013.01); *B61C 17/00* (2013.01); *E01B 27/00* (2013.01); *E01B 29/00* (2013.01); *B60Y 2200/30* (2013.01); *B60Y 2200/41* (2013.01); *Y02T 30/12* (2013.01); *Y02T 30/16* (2013.01)

(56) References Cited

FOREIGN PATENT DOCUMENTS

| | | | |
|---|---|---|---|
| DE | 202010014117 U1 | 12/2010 | |
| DE | 2010014117 U1 * | 1/2011 | ............. E01B 27/00 |
| DE | 102013011125 A1 | 1/2015 | |
| DE | 102013219397 A1 | 3/2015 | |

* cited by examiner

TRACK MAINTENANCE MACHINE WITH AN AUTONOMOUS AND REDUNDANT POWER SUPPLY AND METHOD FOR OPERATING AN ENERGY SUPPLY SYSTEM OF A TRACK MAINTENANCE MACHINE

BACKGROUND OF THE INVENTION

Field of the Invention

The invention relates to a track maintenance machine having a machine frame mobile on a track, various working units, and a combustion engine which may be connected via a clutch to a transfer case, wherein hydraulic pumps for supplying various hydraulic drives of a hydraulic system are connected to said transfer case. The invention further relates to a method for operation of an energy supply system for actuation of various working units and drives of a track maintenance machine mobile on a track having an electrical catenary.

Since track maintenance machines often are often employed also on non-electrified tracks, the supply of energy takes place as a rule exclusively by means of a combustion engine.

SUMMARY OF THE INVENTION

It is the object of the present invention to provide a track maintenance machine and a method of the kind mentioned at the beginning with which a more versatile construction site operation is possible.

According to the invention, this object is achieved by a track maintenance machine having a machine frame being movable on a track, a plurality of working units, a combustion engine to be connected by a clutch to a transfer case, and hydraulic pumps for supplying a plurality of hydraulic drives of a hydraulic system being connected to the transfer case. In order to provide a permanent energy supply of the working units and drives, an electric motor is provided as an alternative drive of the transfer case. The electric motor is coupled to an intermediate circuit which can be supplied with electric energy by a vertically adjustable pantograph to be applied to a catenary of the track. A generator or an electric energy storage device is provided for alternative energy supply of the intermediate circuit. The object is also achieved by a method for operation of an energy supply system for actuation of a plurality of working units and drives of a track maintenance machine being movable on a track having an electrical catenary. The plurality of working units and drives can be supplied with energy by a combustion engine or by an electric motor fed by the catenary, and a changeover between the combustion engine and the electric motor is carried out by a control device in a load operation permanently supplying the working units and drives with energy.

As a result of this combination of features, it is possible in the case of an existing track catenary to use an environment-friendly energy supply, without impairing the work performance of the track maintenance machine in the process. This possibility of a purely electrical drive is very advantageous particularly during working operations in tunnels. Furthermore, it is possible with the electrical drive to significantly reduce the noise emissions as well as the energy consumption. With changing the energy supply during load operation, no interruption of the working advance is necessary, and thus a consistent quality of work quality is ensured.

Specifically, a change between electric motor and combustion engine takes place without interruption of the drive of the transfer case, so that the various hydraulic drives and working units continue to run evenly. This is of advantage particularly with continuously working track maintenance machines, such as tamping machines, cleaning machines, grading machines or machines for stabilising and consolidating the track bed as well as for ballast excavation and ballast distribution. Also, with this type of machine, a catenary presumably remains switched on during a work process. The case is usually different during construction work on the catenary.

Additional advantages of the invention become apparent from the dependent claims and the drawing description.

Advantageously, the combustion engine and the electric motor are controlled by means of a control device which is configured to coordinate operational parameters between the two engines. Thus, the switched-on motor continuously takes over the service performance in a simple manner, in that the rotation speed and torque of the engine to be switched off are assumed.

Furthermore, it is of advantage if, for an alternative energy supply of the intermediate circuit, the electric motor can be powered in generator operation by the combustion engine. This can be useful, on the one hand, in the case of an energy surplus during a breaking phase. On the other hand, this also provides an additional possibility for permanently supplying the intermediate circuit with the pantograph being switched off. Then, the generator provided according to the invention, or the electrical energy storage device, must only be dimensioned for charging the intermediate circuit at the start of a purely combustion engine operation. An on-board electrical system of the track maintenance machine, fed via the intermediate circuit, is thus maintained in generator operation by means of the electrical motor.

In this, it is additionally favourable if a voltage limiter is connected to the intermediate circuit. The same is suitable, for example, to convert surplus braking energy, which cannot be fed into the catenary, into heat.

BRIEF DESCRIPTION OF THE SEVERAL VIEWS OF THE DRAWING

The invention will be described in more detail below with reference to an embodiment represented in the drawings.

DESCRIPTION OF THE INVENTION

Figure 1:
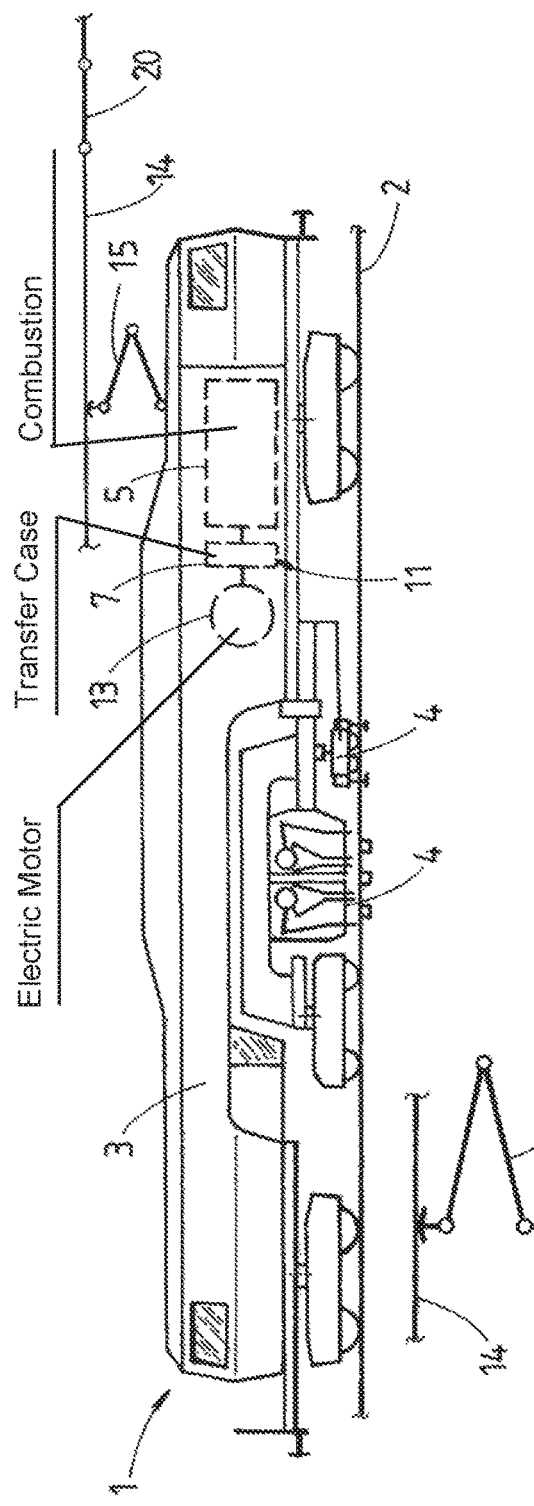
FIG. 1 shows a simplified side view of a track maintenance machine.
Figure 2:
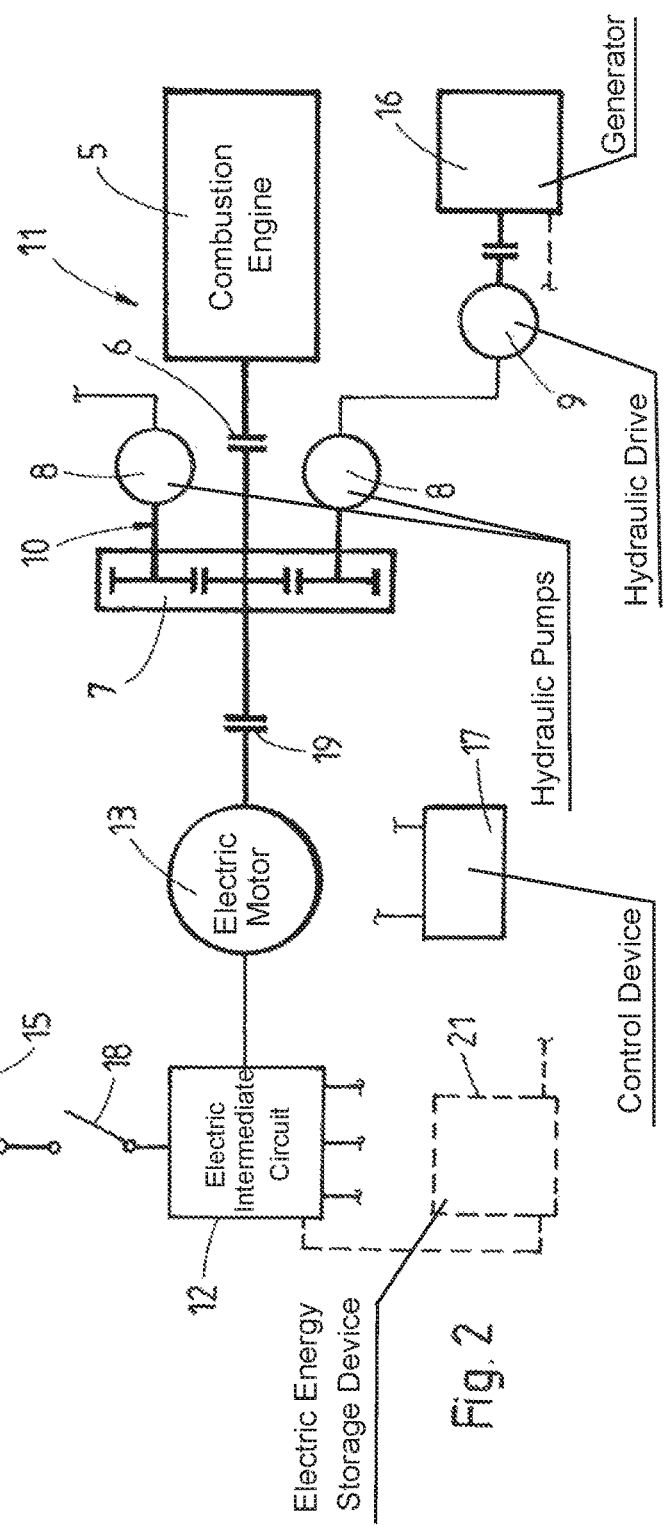
FIG. 2 shows a schematic representation of an energy supply system.

A track maintenance machine 1, shown by example in FIG. 1 as a tamping machine, has a machine frame 3 mobile on a track 2 and is equipped with various working units 4 as well as with a combustion engine 5. As can be seen in FIG. 2, the latter can be connected via a clutch 6 to a transfer case 7. Flange-mounted to the same are hydraulic pumps 8 for supplying various hydraulic drives 9. These, together with the hydraulic pumps 8, form a hydraulic system 10.

To expand an energy supply system 11 formed by the combustion engine 5 and the hydraulic system 10, an electric motor 13 coupled to an electric intermediate circuit 12 is provided. The electric motor 13 can be employed as an alternative drive for the transfer case 7 and may be coupled for energy supply to a vertically adjustable pantograph 15 designed to be applied to a catenary 14 of the track 2. The electric motor 13 is flange-mounted to the transfer case 7 via a sliding clutch 19. Provided for alternative energy supply of the intermediate circuit 12 is a generator 16 or, alternatively, an electric energy storage device 21 shown here in dashed lines. The generator 16 can be powered hydraulically via the transfer case 7 or is coupled to an auxiliary combustion engine. The electric energy storage device 21 can be charged with energy, as desired, by means of the electric motor in generator operation, or via the catenary 14.

For working operations, the hydraulic system 10 can alternatively be supplied with energy by the combustion engine 5 or, in the case of a catenary 14 being present, by the electric motor 13 fed via the catenary 14. The switching between combustion engine 5 and electric motor 13 is carried out advantageously in a load operation, permanently supplying the drives 9 and the working units 4 with energy. Thus, no disadvantageous interruption of the working advance is necessary.

Conveniently, the electric motor 13 is designed as an asynchronous machine which is switched via a converter to the intermediate circuit 12. A bidirectional converter enables a generator operation of the electric motor 13. When this mode of operation is activated, an excitation voltage must be applied to the asynchronous machine. If this voltage is derived from the intermediate circuit voltage, the intermediate circuit 12 must first be charged. If a catenary 14 is available, this takes place by means of the pantograph 15 which is coupled to the intermediate circuit 12 via a main switch 18 and a transformer, not shown. In operation purely by combustion engine, the intermediate circuit 12 is pre-charged by means of the generator 16 or the electric energy storage device 21.

For a change of the energy supply from electric motor 13 to combustion engine 5 taking place during unlimited load operation of the track maintenance machine 1, the combustion engine 5—with the clutch 6 being released from the transfer case 7—is accelerated to a rotational speed as required for the load operation. This change-over of the energy supply is advantageously carried out automatically with activation of a corresponding switch. As a next step, with engaging the clutch 6 by means of a control device 17, all the operational parameters required for the energy supply and for the motor operation are automatically matched to the combustion engine 5 (transfer of control authority).

During this, a rotational speed control of the electric motor 13 becomes inactive, and the combustion engine 5 drives the transfer case 7 with the power required at the moment. In order to ensure this uninterrupted change, both engines 5, 13 are controlled by the same control device 17. Lastly, the energy inflow from the catenary 14 to the electric motor 13 is interrupted by means of the main switch 18. Advantageously, this takes place in an automated way by actuation of the main switch 18 by means of the control device 17.

For changing the energy supply from combustion engine 5 to electric motor 13 taking place during unlimited load operation of the track maintenance machine 1, the main switch 18 is operated for electrically coupling the electric motor 13 to the pantograph 15 applied to the catenary 14. Subsequently, by means of the control device 17, all of the operational parameters required for the energy supply and for the motor operation are automatically matched to the electric motor 13 (transfer of control authority).

Specifically, with pre-charged intermediate circuit 13, the rotational speed control of the electric motor 13 is activated, wherein a prescribed speed of rotation and a rotational torque of the electric motor 13 are matched to an output, to be switched off, of the combustion engine 5. Subsequently, the combustion engine 5 is disconnected from the transfer case 7 by operating the associated clutch 6.

The entire change-over is advantageously carried out automatically by means of the control device 17. Thus, the control device 17 forms a central element which controls both engines 5, 13 as well as the main switch 18. For triggering a change-over between the two motors 5, 13, the control device 17 is connected to an operating unit. However, triggering can also take place automatically, for example after a prescribed time span has elapsed.

As is well known, adjoining sectors of the catenary 14 are separated from one another by so-called transfer points 20 (schematically indicated in FIG. 1). In the case of higher vehicle speeds, due to the kinetic energy present, it is no problem to momentarily interrupt the electric drive in order to pass over the transfer point 20 without power.

For passing over the transfer points 20 of the catenary 14 under load operation of the track maintenance machine 1, a change-over of the energy supply from the electric motor 13 to the combustion engine 5 after activation of the control device 17 before the transfer point 20 and, after an adjustable time span or a prescribed path covered, an automatic change-over of the energy supply from the combustion engine 5 to the electric motor 13 take place automatically. In this, it may also be favourable if sensors report to the control device 17 that the passing of a transfer point 20 has been completed. Such a report then automatically triggers a change-over back to the electric motor 13.

The invention claimed is:

1. A track maintenance machine, comprising:
 a machine frame being movable on a track having a catenary;
 a plurality working units;
 a combustion engine;
 a transfer case;
 a clutch for connecting said combustion engine to said transfer case;
 a hydraulic system having a plurality hydraulic drives;
 hydraulic pumps for supplying said plurality of hydraulic drives, said hydraulic pumps being connected to said transfer case;
 an electric motor provided as an alternative drive of said transfer case for permanent energy supply of said plurality of working units and said plurality of drives;
 an intermediate circuit coupled to said electric motor;
 a vertically adjustable pantograph to be applied to the catenary for supplying said intermediate circuit with electric energy; and
 a generator or an electric energy storage device for an alternative energy supply of said intermediate circuit.

2. The track maintenance machine according to claim 1, which further comprises a control device controlling said combustion engine and said electric motor for coordinating operating parameters between said combustion engine and said electric motor.

3. The track maintenance machine according to claim 1, wherein said electric motor is drivable in a generator operation by said combustion engine for the alternative energy supply of said intermediate circuit.

4. The track maintenance machine according to claim 1, which further comprises a voltage limiter connected to said intermediate circuit.

5. A method for operating an energy supply system for actuation of a plurality of working units and drives of a track maintenance machine being movable on a track having an electrical catenary, the method comprising the following steps:

using a combustion engine or an electric motor fed by the catenary to supply the plurality working units and drives with energy;

using a control device in a load operation permanently supplying the working units and drives with energy for changing over between the combustion engine and the electric motor;

automatically passing over a transfer point of the catenary under load operation after activation of the control device by:

changing over the energy supply from the electric motor to the combustion engine before the transfer point; and changing over the energy supply from the combustion engine to the electric motor after passing over the transfer point.

6. The method according to claim 5, which further comprises carrying out the step of changing over the energy supply from the electric motor to the combustion engine by:

accelerating the combustion engine up to a speed of rotation required for a load operation, with a clutch being released from a transfer case;

with the engaging of the clutch, using the control device to automatically match all operational parameters required for the energy supply and motor operation to the combustion engine; and interrupting the energy supply from the catenary to the electric motor.

7. The method according to claim 5, which further comprises carrying out the step of changing over the energy supply from the combustion engine to the electric motor by:

closing a main switch for activation of the energy supply by using a pantograph applied to the catenary;

with the closing of the main switch, using the control device to automatically match all operational parameters required for the energy supply and motor operation to the electric motor; and using a clutch to disengage the combustion engine from a transfer case.

8. The method according to claim 5, which further comprises carrying out the change-over of the energy supply from the combustion engine to the electric motor automatically after a predetermined time span has elapsed, or a prescribed path has been covered, starting with the change-over of the energy supply from the electric motor to the combustion engine.

* * * * *